US010956522B1

(12) United States Patent
Jha et al.

(10) Patent No.: US 10,956,522 B1
(45) Date of Patent: Mar. 23, 2021

(54) REGULAR EXPRESSION GENERATION AND SCREENING OF TEXTUAL ITEMS

(71) Applicant: Facebook, Inc., Menlo Park, CA (US)

(72) Inventors: Abhay Kumar Jha, Belmont, CA (US); Emanuel Alexandre Strauss, San Mateo, CA (US)

(73) Assignee: Facebook, Inc., Menlo Park, CA (US)

( * ) Notice: Subject to any disclaimer, the term of this patent is extended or adjusted under 35 U.S.C. 154(b) by 208 days.

(21) Appl. No.: 16/003,770

(22) Filed: Jun. 8, 2018

(51) Int. Cl.
*G06F 16/00* (2019.01)
*G06F 16/9535* (2019.01)
*G06F 16/33* (2019.01)
*G06F 16/35* (2019.01)
*G06Q 30/02* (2012.01)
*H04L 29/06* (2006.01)
*G06N 3/08* (2006.01)

(52) U.S. Cl.
CPC ........ *G06F 16/9535* (2019.01); *G06F 16/334* (2019.01); *G06F 16/355* (2019.01); *G06N 3/08* (2013.01); *G06Q 30/0277* (2013.01); *H04L 63/20* (2013.01)

(58) Field of Classification Search
CPC .... G06F 11/3604; G06F 16/125; G06F 16/20; G06F 16/2365; G06F 21/62; G06F 21/6254
USPC ................................. 707/600–899; 726/1–36
See application file for complete search history.

(56) References Cited

U.S. PATENT DOCUMENTS

| | | | | |
|---|---|---|---|---|
| 8,788,442 | B1 * | 7/2014 | Sculley, II | G06N 20/00 706/20 |
| 9,286,391 | B1 * | 3/2016 | Dykstra | G06F 16/9024 |
| 10,671,936 | B2 * | 6/2020 | Bouveyron | H04L 41/0893 |
| 2009/0024554 | A1 * | 1/2009 | Murdock | G06Q 30/02 706/48 |
| 2013/0167192 | A1 * | 6/2013 | Hickman | G06F 21/60 726/1 |
| 2014/0108128 | A1 * | 4/2014 | Patel | G06Q 30/0256 705/14.43 |
| 2014/0280152 | A1 * | 9/2014 | Jin | G06F 16/285 707/737 |
| 2015/0363407 | A1 * | 12/2015 | Huynh | H04L 67/02 707/738 |
| 2018/0218075 | A1 * | 8/2018 | James | G06F 16/313 |
| 2019/0147371 | A1 * | 5/2019 | Deo | G06N 20/00 706/12 |

* cited by examiner

*Primary Examiner* — Michelle N Owyang
(74) *Attorney, Agent, or Firm* — Fenwick & West LLP

(57) ABSTRACT

An online system enforces policies to content items that are distributed on its platform and blocks content items that violate one or more of those policies. To identify content items that are slightly varied from each other, the online system generates an embedding for each of the known content items that have already been determined to be noncompliant with one or more policies. The online system then groups the known noncompliant content items that are clustered together in the embedding space. The texts of the group of known noncompliant content items are converted to finite state automata and are merged to generate a common automaton. The common automaton is used to generate a common regular expression that is used to screen new content items. When a new content item matches the textual pattern defined by the common regular expression, the system may block the new content item.

18 Claims, 6 Drawing Sheets

REGULAR EXPRESSION GENERATION AND SCREENING OF TEXTUAL ITEMS

BACKGROUND

This invention generally relates to adaptive generation of regular expressions, and in particular to generation of regular expressions based on semantic analysis and classification of textual content of items using machine learning and embedding techniques.

Many online systems, such as social networking systems, serve as common platforms for users to connect, interact, and communicate with others. The users may be individuals, companies, entities, and even robots. Those online systems often allow users to upload content items and share the content items with their connections and sometimes with the general public. The content items may take various forms, including text, images, audios, videos, hyperlinks, interactive objects, and the like. The subject matters of the content items vary and in some cases may include promotional content such as advertisements.

To ensure a high quality user experience and to comply with different laws and regulations, an online system often includes one or more policies that regulate the posting of the content items. For example, an online system may have policies that generally prohibits adult content, phishing communications, scams, fraudulent schemes, and the like. In some high traffic online systems, millions or even billions of content items are generated on a daily basis. The policing of content items and enforcement of various content policies have become increasingly challenging for those large-scale online systems. Conventional techniques that mainly rely on reports, complaints, and reviews are often too labor-intensive, ineffective, and slow.

SUMMARY

The enforcement of content policies for an online system is especially difficult when the content generating users upload their content items with full intention to avoid and circumvent the enforcement. Oftentimes those users have different accounts that are set up for distributing and disseminating their noncompliant content items. The phrase "noncompliant content items" here refers to content items that violate one or more policies of the online system. The phrase "good content items" or "compliant content items" here refers to content items that comply with the policies of the online system. In response to the removal of their uploaded content items and/or the ban of their accounts, those ill-behaved users will upload other items with similar content through other accounts. To further circumvent the enforcement, those users may vary the newly uploaded items to a certain extent. Those variations of noncompliant content items often are generated from a common template that defines the subject matter and/or the textual structure of the content items. The change of the exact wordings of the noncompliant content items makes the screening of those items especially challenging by conventional textual analysis method such as keyword search or phrase search.

Embodiments described herein generally relate methods to generate multiple regular expressions that are used to screen newly uploaded content items, such as users' posts, profile updates and advertisements. An online system may perform the method by first storing a plurality of content items that have already been determined to be noncompliant, such as those items that are taken down after reports and reviews. The plurality of noncompliant content items are then analyzed syntactically and semantically to cluster the noncompliant content items into one or more different groups. Each cluster contains noncompliant content items that are syntactically and/or semantically similar. The text of the noncompliant content items is then extracted to generate a common regular expression. A regular expression defines a textual pattern of a string of words and is not limited to the exact arrangement and choices of words. As such, the generated common regular expression defines a textual pattern that is commonly present in the clustered noncompliant content items. If a new content item matches one or more generated regular expressions, the result indicates that the new content shares common textual patterns with some of the known noncompliant content items. This implies that the new content item is syntactically and/or semantically similar to some of those noncompliant content items and/or may be generated based on the same template as those noncompliant content items. Hence, such new content item may then be flagged for further evaluation and/or be automatically removed from the online system.

Specifically, in accordance with an embodiment, the method of generating a regular expression may begin with an online system accessing a data store that contains a plurality of known noncompliant content items. The online system then generates an embedding for each of the plurality of noncompliant content items. An embedding can be a mathematical vector that represents the semantic characteristic of the corresponding content item. Each embedding corresponds to the textual content of a single content item and can be mathematically represented in an embedding space. The online system groups two or more of the content items into a cluster based on distances among the corresponding embeddings in the embedding space. In other words, the embeddings allow the online system to group content items that are syntactically and/or semantically similar together. For each content item whose embedding belongs to the cluster, the online system extracts a string of words from the item's textual content. Based on the extracted multiple strings of words, a common regular expression that represents the common textual pattern of the extracted strings of words is created. After the common regular expression is created, new content items received by the online system for distribution are screened by applying the common regular expression to determine whether the new content items match the common regular expression.

By clustering noncompliant content items through a semantic analysis such as the creation of embeddings, the generation of common regular expressions can become sufficiently selective so that useful textual patterns are captured by the online system to screen new content items. The generation of regular expressions based on syntactically and/or semantically related noncompliant content items ensures that the textual patterns represented by the regular expressions are specific enough to avoid other content items that are in fact in compliance with the policies of the online system. Such regular expressions are generally helpful in an automatic screening process because the regular expressions usually do not falsely classify good content items as noncompliant content items. In some embodiments, an additional adaptive process is employed to perform quality control of the regular expressions that are generated. The process involves using the regular expressions to test a collection of known good content items that have already been determined to be compliant with the policies of the online system. If a good content item contains the textual pattern represented by the regular expression, a match is found. After the regular expression is tested with the collection of content items, an overall match rate is found. If the match rate exceeds a threshold rate, the result indicates that the regular expression has a high false positive match rate (i.e. the rate that regular expression results in a false identification of a good content item as a noncompliant content item). In such case, the online system may remove such regular expression from future use in screening new content items.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overall System Environment

Figure 1:
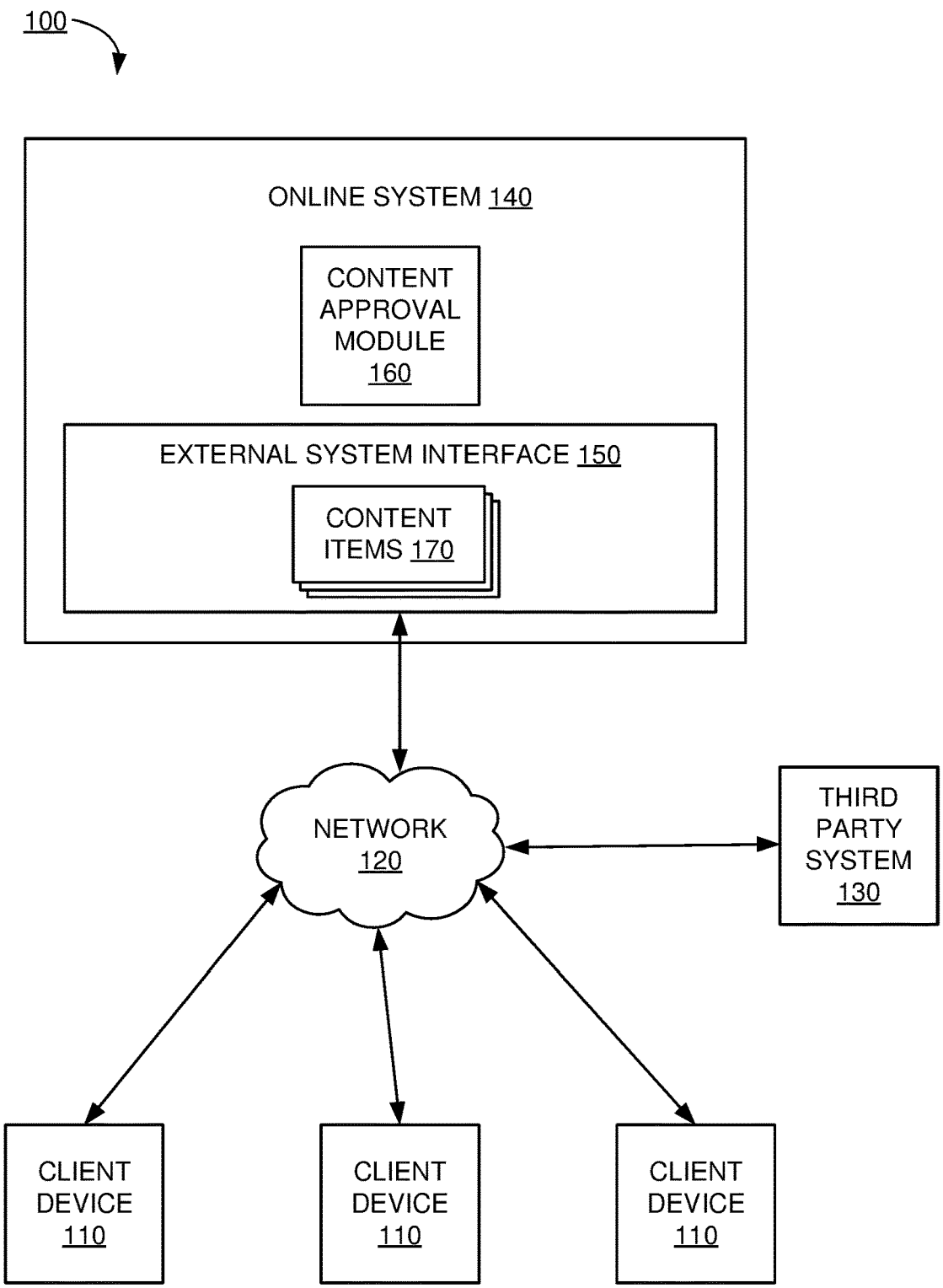
FIG. 1 is a block diagram of a system environment for an online system.

FIG. 1 is a block diagram of a system environment 100 for an online system 140. The system environment 100 shown by FIG. 1 comprises one or more client devices 110, a network 120, one or more third-party systems 130, and the online system 140. Different and/or additional components may be included in the system environment 100. The online system 140 may be a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

The online system 140 includes an external system interface 150 for transmitting and receiving data among the online system 140, one or more client devices 110, and the third party system 130. In one aspect, the external system interface 150 is used to as a platform to receive content items 170 that are uploaded by the client devices 110 and/or the third party system 130. A content item can take the form of a page post, a status update, a photograph, a video, a link, a shared content item, advertisement, a gaming application achievement, a check-in event at a local business, a brand page, or any other type of content. The content items 170 may also include content that are directly associated with the uploaded content in the online system 140. For example, the content items 170 may include the landing page of a link uploaded to the online system 140.

The online system 140 also includes a content review module 160 that is configured to screen and remove the content items 170 that are determined to be noncompliant with one or more policies of the online system 140. Detailed implementation of the content review module 160 will be discussed further below. In one embodiment, the content review module 160 is used in an advertisement subsystem of the online system 140 and is used to screen and approve advertisements to be distributed on the online system 140. In another embodiment, the content review module 160 is used to screen user generated posts before the posts are made available to other users and/or to the public.

Figure 2:
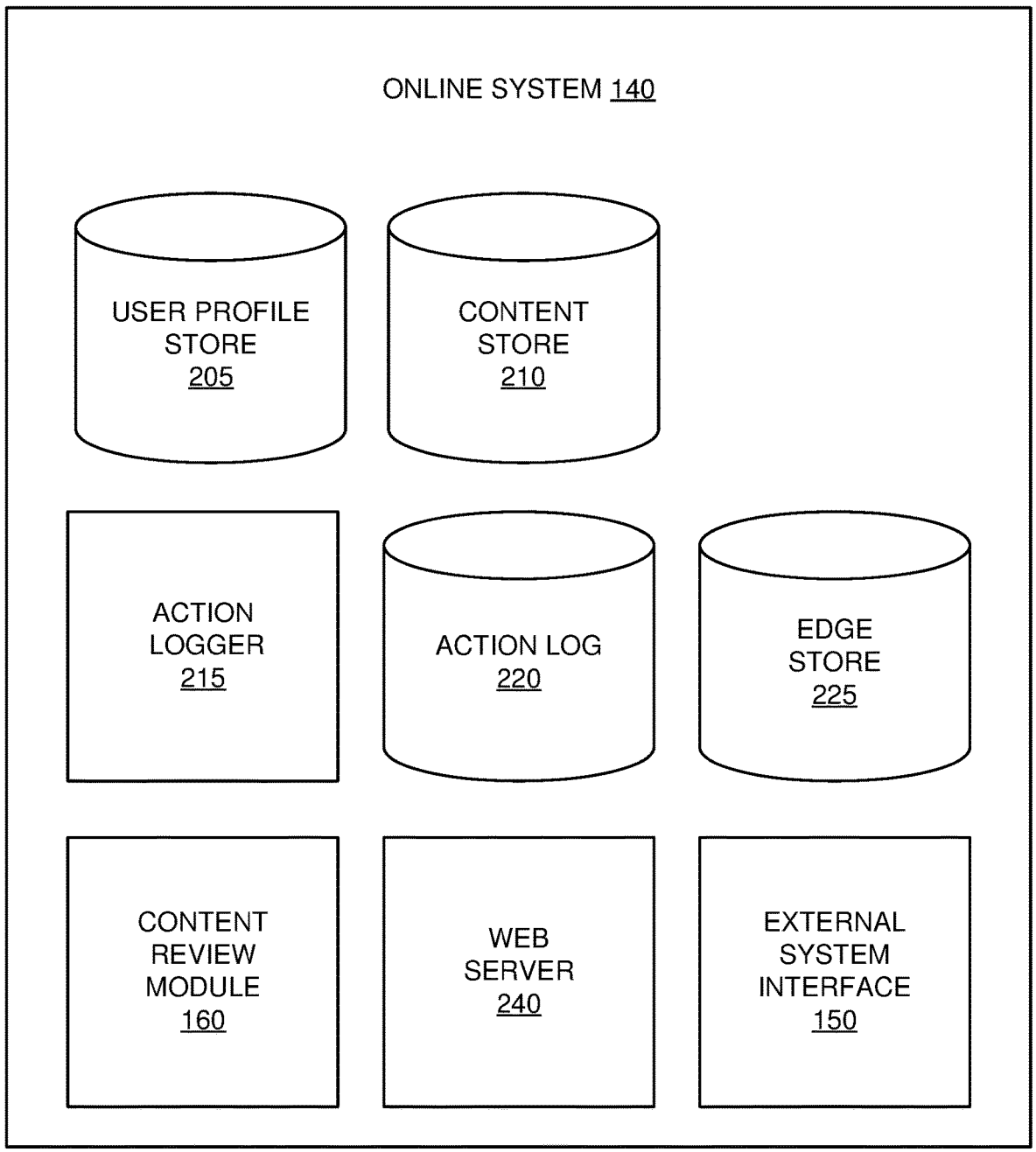
FIG. 2 is a block diagram of an example architecture of the online system illustrated in FIG. 1.

FIG. 2 is a block diagram of an example architecture of the online system 140. The online system 140 shown in FIG. 2 includes a user profile store 205, a content store 210, an action logger 215, an action log 220, an edge store 225, the content review module 160, a web server 240, and the external system interface 150. In other embodiments, the online system 140 may include additional, fewer, or different components for various applications. Conventional components such as network interfaces, security functions, load balancers, failover servers, management and network operations consoles, and the like are not shown.

The users, including individual users and other users such as associations, companies, or other entities, of the online system 140 may be associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

The content store 210 stores content items, which can take the form of database objects that each represent various types of content. In embodiments that may involve advertisements as content items, the content items in the content store 210 may include content for presentation to a user and a bid amount. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 may include multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Each user or object can be represented as a node in the social network and the nodes are connected to each other via edges. In one embodiment, the nodes and edges form a complex social network of connections indicating how users and/or objects are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

The content review module 160 is configured to review content items intended for display to users of the online system 140. The online system 140 may have one or more policies restricting the types of content items that may be displayed. Each policy may correspond to a type of restricted content, such as content soliciting the selling/purchase of certain types of goods or services, content containing profanity, sexual content, violent content, racist content, illegal content, and/or the like, wherein content items depicting restricted content may be deemed unsuitable for display to users of the online system 140. In some embodiments, a policy may apply to only a subset of the users of the online system 140 (e.g., a particular policy may restrict certain content from being displayed to users below a threshold age, while the content may be displayed to users above the threshold age) or only to certain contexts of the online system (e.g., a policy restricting certain content may be enforced when a user is accessing a social page of the online system, but not when accessing a marketplace page of the online system). The content review module 160 extracts text associated with each content item, and determines if the text associated with each content item violates one or more policies by manners that are described in further details below.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Content Item Review System

Figure 3:
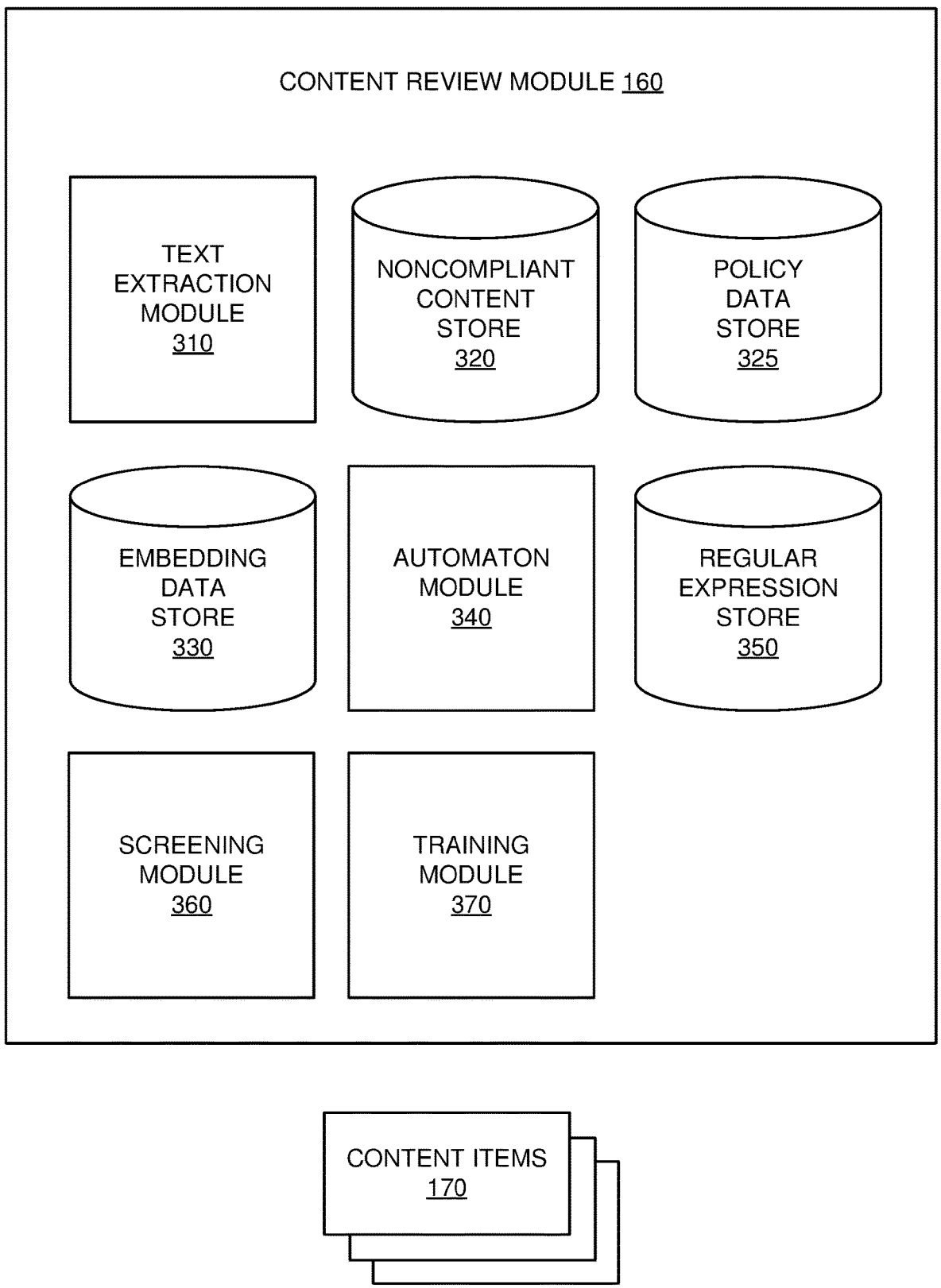
FIG. 3 is a block diagram of an example content review module, in accordance with some embodiments.

FIG. 3 illustrates a block diagram of an example content review module 160 in accordance with some embodiments. The content review module 160 in other embodiments may include additional, fewer, and different components. The content review module 160 is configured to receive a new content item, screen the new content using its sub-modules and determine whether the new content likely to be noncompliant with one or more policies of the online system 140.

The content review module 160 includes a text extraction module 310 that is configured to extract textual content of a content item 170. The content item 170 may be received from a noncompliant content store 320, from the external system interface 150 of the online system 140, or from an upload by a user. The textual content of the content item 170 can take the form of text strings included in the content item 170 or can be in other forms such as text in an image, utterances in an audio, or dialogues in a video. In the cases when the content item 170 includes images, audios, and/or videos, the text extraction module 310 may utilize an image-to-text algorithm such as optical character recognition (OCR) and/or a speech recognition algorithm to extract the additional textual content present in the content item 170. In some cases, the content item 170 may include a landing page of a website or may be received in the format of HTML or other program languages. The text extraction module 310 is also configured to parse the program language, such as the HTML file, to extract the actual textual content that are intended to be printed or displayed.

The content review module 160 also includes a noncompliant content store 320, which include one or more databases that store content items 170 that have already been determined to be noncompliant with one or more policies of the online system 140. The noncompliant content store 320 may store the actual content items or only the extracted text associated with the content items. The content items may be determined to be noncompliant by different ways. In one case, a noncompliant content item is determined manually based on review of a moderator of the online system 140 or based on a verified user complaint. In another case, a noncompliant item is determined by screening of content items uploaded from known violators of the policies of the online system 140. In yet another case, a noncompliant item is screened automatically (in a manner that will be discussed in further detail below) by the content review module 160 itself and such identified noncompliant item is fed back into the content review module 160 and saved in the noncompliant content store 320.

In addition, the noncompliant content store 320 may store information and metadata associated with the noncompliant content items. In some embodiments, each policy of the online system 140 is associated with a corresponding data store indicating content items that have been determined to violate the policy. The noncompliant content store 320 may classify the known noncompliant content items by policies and store the noncompliant content in a relational database format. The classification based on policies allows the content review module 160 to retrieve known noncompliant content items by selecting one or more policies, although in some cases the content review module 160 may retrieve all of the noncompliant content items stored.

The content review module 325 also includes policy data store 325 that store information associated with one or more policies. The policy data stores 325 stores a policy object corresponding to each policy. The policy object for a policy may specify various attributes of the policy such as a policy name/identifier, types of content that the policy applies to, attributes of users to which the policy applies, etc. In some embodiments, a policy object stores one or more rules specifying types of content items that conform to the policy or violate the policy.

The content review module 160 further includes an embedding data store 330, which includes one or more databases that store embeddings of noncompliant content items. The content review module 160 generates an embedding for each of the plurality of noncompliant content items stored in the noncompliant content store 320. An embedding is created by the text used to generate the embedding. Each embedding corresponds to a noncompliant content item retrieved from the noncompliant content store 320. Such embedding can be a vector that has a direction and a magnitude that combined represent the syntactic and/or semantic relationships among other textual items that are also converted to embeddings. For example, when two embeddings are similar (i.e. vectors having similar directions and magnitudes), it implies that the corresponding textual items may be semantically related. The details on how the embedding of each content item can be generated will be further discussed below. When the embeddings are generated, they are stored in the embedding data store 330.

The content review module 160 further includes an automaton module 340 that includes different algorithms to generate and operate automata. The automata generated are usually finite automata such as deterministic finite automata (DFA) and are converted to regular expressions. The automaton module 340 also includes other algorithms to manipulate different automata. For example, a group of automata can be merged together by a merging algorithm of the automaton module 340. In one case, a group of similar textual items, as determined by the information of embedding data store 330, are each represented by a regular expression. Each of the regular expression in the group is converted to an automaton. The automata in the group is then merged together by the automaton module 340 to form a single automaton. The single automaton is converted to a common regular expression that is stored in a regular expression store 350.

The regular expression store 350 include one or more databases that store a collection of regular expressions that define textual patterns of strings of words that are found in noncompliant content items. The generation of such regular expressions are based on the embedding data store 330 and will be discussed in further detail below. When a new content item is submitted to the online system 140, the content review module 160 utilizes a screening module 360 to screen the new content item. The screening module 360 is configured to retrieve a collection the regular expressions form the regular expression store 350 and use the regular expressions, one by one, to compare the textual content of the new content items to determine whether a regular expression matches the new content item. If a match is found, depending on the confidence level of the accuracy of each regular expression, different actions can be taken against the new content items. In one case, the new content item is flagged for further review and evaluation. In another case, the new content item is automatically blocked and withheld from users of the online system 140. In some extreme cases, the access privilege of the user who submitted the new content item can also be revoked and the user's account is banned. When a new content item is determined to be a noncompliant content item, the new content item is stored in the noncompliant content store 320.

In some embodiments, the regular store 350 classifies the regular expressions by policies and stores the regular expressions in a relational database format. Depending on the nature of new content item and/or the source of the new content item (e.g. whether the new content item comes from a long-time account, whether the new content item is intended for underage users, etc.), the new content item is screened for different subsets of policies. In such case, the regular expressions associated with a subset of policies are selected to screen the new content item. In one case, if the new content item is uploaded from a new account that does not have sufficient posting history, for enhanced security the new content item can be screened by all regular expressions stored in the regular expression store 350.

In some cases, the regular expressions that are stored in regular expression store 350 are further evaluated based on a training module 370. The training module 370 is configured to reduce the false positive rate of the regular expressions that are used to screen new content items and to eliminate those regular expressions with unacceptable false positive rate. A false positive result here refers to a situation where a new content items that is in fact in compliance with the policies of the online system 140 matches with one of the regular expressions stored in regular expression store 350 and, as a result, is flagged or is even prevented from publishing. A regular expression having a high false positive match rate with good content items indicates that the textual pattern represented by the regular expression may be commonly present in both compliant and noncompliant content items and, thus, is not a good regular expression to be used to screen new content item. When a regular expression's false positive match rate is higher than a threshold rate, the training module 370 can cause the regular expression store 350 to remove the regular expression from the database.

The training module 370 may also assign one or more confidence level values to each regular expression with respect to all policies or some specific policies. The confidence level value is a statistical measure that indicates how accurate (in terms of a low false positive rate) a regular expression is. Based on the confidence level value, the content review module 160 can carry out different actions on a matched new content item that is suspected to be noncompliant. For example, if a new content item matches a regular expression that has a high confidence level, the content review module 160 may automatically block the new content item. Also by example, if a new content item matches another regular expression that a low (but not unacceptable) confidence level, the content review module 160 may flag the new content item for further investigation.

Regular Expression Generation and New Content Screening

Figure 4:
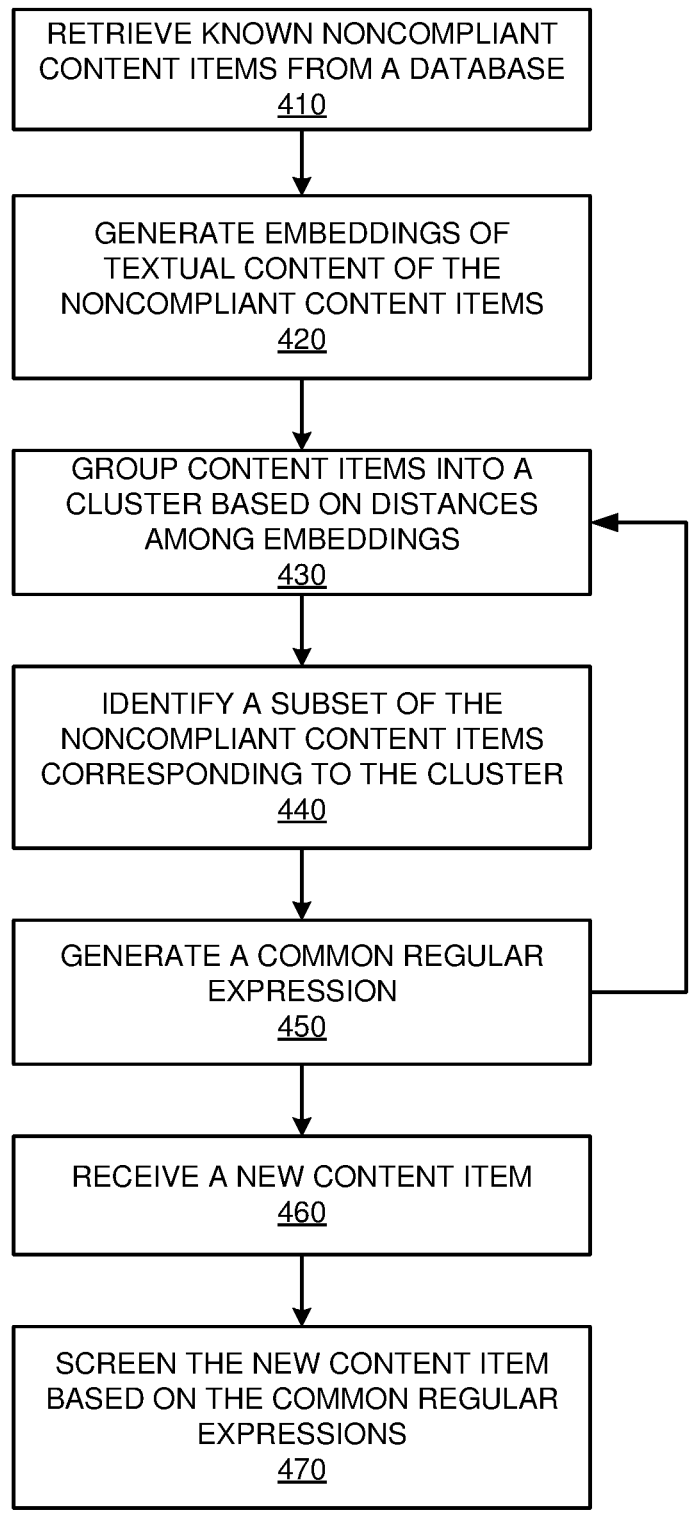
FIG. 4 illustrates a flowchart of a process for generating a regular expression to review a new content item in accordance with some embodiments.

FIG. 4 illustrates a flowchart of a process performed by an online system for generating a regular expression to screen a new content item in accordance with some embodiments. The process can be performed, for example, by the online system 140 or its module such as the content review module 160. In some embodiments, in 410 the online system 140 accesses a data store, such as noncompliant content store 320, which contains a plurality of content items that have already be determined to be noncompliant with one or more policies of the online system 140. The online system 140 then retrieve a plurality of known noncompliant content items from the database. The online system 140 may retrieve all noncompliant content items stored or some noncompliant content items that are associated with certain specific policy violations.

In 420, the online system 140 generates an embedding for each of the plurality of noncompliant content items using the textual content of the noncompliant content item. The embeddings are represented in an embedding space such as an N-dimensional latent space. Each embedding corresponds to one noncompliant content item. In 430, the online system 140 groups two or more of the noncompliant content items into a cluster based on distances among the embeddings within the embedding space. The noncompliant content items that are grouped into a cluster are indicated to be semantically related and may come from the same template that generates noncompliant content items.

In 440, the online system 140 identifies a subset of the noncompliant items from the pool of noncompliant content items stored in the noncompliant content store 320. The subset of the noncompliant content items correspond to the cluster as indicated by the location of the embeddings in the embedding space. The textual content of each of the content items in the subset are extracted. For example, a string of words from the textual content of each of the noncompliant content items of the subset are extracted. In some cases, the string of words can be the entire textual content of the noncompliant content item.

In 450, the online system 140 uses the extracted textual content to generate a common regular expression that matches the noncompliant content items in the subset. The common regular expression represents a general expression that is applicable to the noncompliant content items in the subset. The generation of the common regular expression is based on the common textual pattern of each of the extracted textual content.

The process described in 430 to 450 is repeated for other noncompliant content items that are represented by other clusters in the embedding space. For example, the online system 140 may receive numerous content items that violate different policies. The noncompliant content items may also come from different sources and based on different templates. Hence, the embedding space may include multiple clusters. Each cluster is possibly associated with a common source of noncompliant contents or based on a common template. The process described in 430 to 450 is repeated to generate different common regular expressions that are associated with different clusters in the embedding spaces.

In 460, the online system 140 receives a new content item that is intended for distribution by the online system. Before the online system 140 distributes the new content item and make the new content item available to other users, the online system 140 uses the generated common regular expressions to screen the new content item in 470. The screening includes applying each of the common regular expressions to determine whether the new content item matches the common regular expression. When a match is found, the new content item may be flagged for further review or may be automatically withheld from the users of the online system 140. Also, the new content item may also be added to noncompliant content store 320 to generate an additional embedding and potentially an additional common regular expression.

Figure 5A:
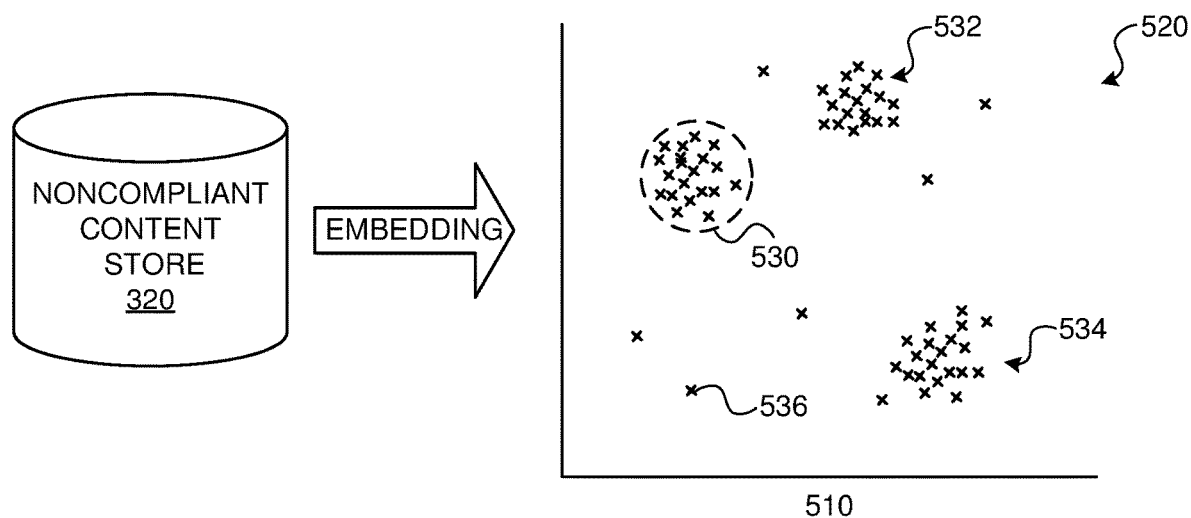
FIGS. 5A and 5B illustrate generation of embeddings and generation of a regular expression in accordance with some embodiments.
Figure 5B:
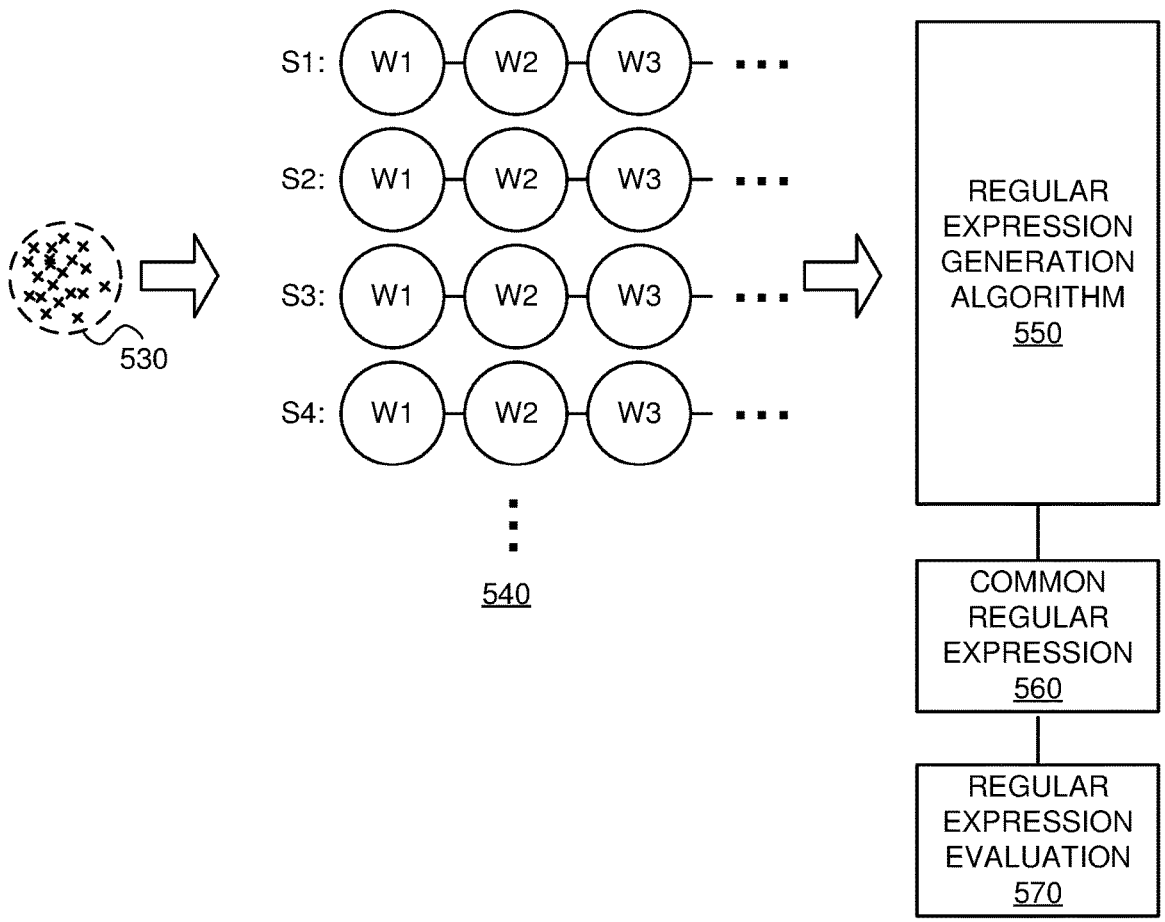

FIGS. 5A and 5B illustrate in further details on how embeddings are generated for the noncompliant content items and how a common regular expression is generated. The process begins with the noncompliant content store 320, which stores a collection of known content items that have already been determined to be noncompliant with one or more policies of the online system 140. The textual content of each noncompliant item is used to generate an embedding.

In some embodiments, the words of the textual content are mapped into vectors using different embedding techniques such as term frequency-inverse document frequency (TF-IDF) vectorization, continuous big-of-words (CBOW) model, and/or skip-gram model. The mapping process may be conducted through a supervised or unsupervised neural network. The generation of the word vectors are based on aggregated word-to-word co-occurrence statistics from a corpus. A corpus may be selected from a collection of textual content of the content items stored in noncompliant content store 320 and may additionally include other sources of text from books, publications, online articles, advertisements, and etc. to provide additional training to a neural network that performs the word vector generation. Each word vector generated corresponds to a word and represents the semantic correlation, similarity, and difference of the word with respect to other words in the corpus. Techniques such as TF-IDF vectorization may be used to penalize the weight of common words such as articles, prepositions and conjunctions that carry little significance in defining semantic characteristics of a text.

The generation of an embedding for each noncompliant content item stored in the noncompliant content store 320 can be achieved in different ways. In one embodiment, after the words of a noncompliant content item are converted into word vectors, an average of all of the word vectors can be calculated to generate a common vector that has a specific direction and magnitude. The average can be a simple average or a weighted average. For example, the weighted average can be calculated based on the number of occurrences of a word in the noncompliant content item. Techniques such as TF-IDF vectorization may be used to reduce the weight of common words that do not carry much semantic significance. The averaged vector represents an overall semantic characteristic of the textual content of the noncompliant content item in the form of a mathematical vector. Such averaged vector is served as the embedding of the noncompliant content item. In another case, instead of taking the average of all word vectors of a noncompliant content item, a certain number (e.g. ten) of top semantically significant word vectors of the noncompliant content item are selected to generate an averaged vector.

In another embodiment, the generation of an embedding for each noncompliant content item stored in the noncompliant content store 320 is carried out through a neural network. The neural network can be a deep neural network that includes an input layer, an output layer, and one or more hidden intermediate layers. Each layer includes one or more nodes that are connected to other layers. A layer receives inputs from a preceding layer and produces outputs for a succeeding layer. In one case earlier layers (i.e. layers closer to the input layer) are configured to capture syntactic meanings of the textual content, while later layers (i.e. layers closer to the output layer) are configured to capture semantic meanings of the textual content. The layers of the neural network perform recognition of syntactic and/or semantic features by convolution, clustering, classification, matching, and/or the like. The neural network is configured to receive the textual content of the noncompliant content item or the word vectors of the content item as input. The neural network is configured to output a vector that represents the semantic characteristic of the textual content of a noncompliant item after the input is analyzed through multiple layers and nodes. The output vector represents the semantic characteristic of the textual content and is served as the embedding of the noncompliant content item.

A chart 510 in FIG. 5A is a visual representation of an embedding space 520 that includes the embeddings generated from noncompliant content items stored in the noncompliant content store 320. It should be noted that the two-dimensional chart 510 may be a simplified representation of the embedding space 520. The embedding space 520 can be an N-dimensional latent space that includes embeddings having N dimensions. The marks in the chart 520 represent the data points of the embeddings with each embedding having a direction and a magnitude. For example, each mark may represent the direction and the magnitude of an embedding from the origin. Some of the embeddings may be grouped in different clusters, as represented by example clusters 530, 532, and 534, while other embeddings, such as an embedding 536, may be scattered and positioned relatively separated from the rest of the embeddings. Since the embeddings are generated based on the semantic characteristics of each corresponding textual content, the clusters 530, 532 and 534 may represent groups of noncompliant content items that have similar textual content and, in some cases, that are generated based on the same template. The scattered embeddings such as the embedding 536 may represent a noncompliant content item that is not similar to other content items. For example, the upload of the noncompliant content item may be a unique and isolated incident.

The grouping of two or more noncompliant items into a cluster may be based on the distances among the embeddings of the content items in the embedding space 520. For example, an algorithm may be employed to determine whether or not a plurality of embeddings are statistically likely to belong to a cluster based on the distances of those embeddings among each other with respect to other embeddings in the entire embedding space 520. The volume of a space occupied by those embeddings is calculated and the density of the space is determined. Whether the plurality of embeddings constitute a cluster is then determined based on how densely occupied the space is relative to other groups of embeddings in the embedding space 520. Also by way of example, an algorithm may start with an embedding in the embedding space 520 and determine how many embeddings are located within a certain distance of the started embedding. The density around the started embedding is then compared to the densities of other embeddings to determine whether some the embeddings are clustered. In some cases, the determination of clusters may alternatively or additionally involve the use of other statistical techniques such as principal component analysis.

A cluster of embeddings may also include sub-clusters. Algorithms that determine clustering of embeddings may be carried out in multiple additional iterations to sub-divide a cluster into multiple sub-clusters. The presence of statistically significant sub-clusters may indicate that a semantically similar group of noncompliant content items can be further divided into multiple sub-groups that have even more similar syntactic and/or semantic relationship among the members of the sub-group relative to the larger group. For example, a main cluster may represent a group of noncompliant content items that are uploaded from the same or a similar source while the sub-clusters may represent different versions of templates that change the way of presentations of the noncompliant content items from time to time. Both the main cluster and the sub-clusters can be used to generate regular expressions so that one cluster may generate more than one regular expression used to screen new content items.

After a cluster (which can be a cluster or a sub-cluster) of embeddings is identified, the textual content of the corresponding noncompliant content items are further analyzed to generate a common regular expression. FIG. 5B illustrates an example process of generating a common regular expression using the cluster 530 in the embedding space 520 (shown in FIG. 5A). Since each embedding in cluster 530 corresponds to a noncompliant content item stored in the noncompliant content store 320, the embeddings in cluster 530 correspond to a plurality of noncompliant content items. After the corresponding noncompliant content items are identified, the textual content of each of the corresponding noncompliant content items is retrieved from the noncompliant content store 320. For example, a string of words is extracted from each of the textual content. In one case, the string of words is a portion of the textual content that includes certain keywords that the online system 140 determines to be likely associated with certain noncompliant content. In another case, the online system 140 simply uses the entire textual content as the string of words.

The strings of words extracted from the clustered noncompliant content items are represented in 540. S1, S2, S3, and S4 respectively represent a string extracted from a separate noncompliant content item in the cluster 530. In other words, S1 is a string of words extracted from a first noncompliant content item in the cluster 530, S2 is a string of words extracted from a second noncompliant content item in the cluster 530, etc. Each string of words includes one or more words that are represented by W1, W2, W3, etc. It should be noted that there can be more than three words in each string and there can be more than four strings in the cluster 530. Also, the words and the word combinations in each string may or may not be the same. For example, W1 in S1 may be different from W1 in S2.

After multiple strings of words are retrieved and collected, the strings of words are used to generate a common regular expression using a regular expression generation algorithm 550. In one embodiment, the regular expression generation algorithm 550 includes an automaton algorithm that generates automata such as finite automata. A finite automaton is a machine that has finite states and finite possible outcomes in each state. A regular expression can be represented by a finite automaton. A finite automaton can be generated by a regular expression using techniques such as Thompson's construction. A finite automaton either accepts or rejects a string. If the finite automaton accepts a string, the string belongs to a text pattern defined by the regular expression that generates the finite automaton. Otherwise, the string does not belong to text pattern. For each noncompliant content item, a string of words (S1, S2, or so on) is first converted to a regulation expression. The regular expression is then transformed into an equivalent finite automaton. The finite automaton may be further processed by deterministic finite automaton (DFA) minimization to change the automaton from nondeterministic to deterministic. Since there are multiple content items in the cluster 530, multiple individual finite automata are generated. The finite automata are then merged together by the algorithm 550 to generate a single common finite automaton. The merging process may involve combining different states of the finite automata and accounting for different conditions of the finite automata with respect to each state. After the common finite automaton that is defined commonly by the strings of text S1, S2 etc. is generated, a common regular expression 560 equivalent to the common finite automaton is generated. The common regular expression 560 can be stored in a database such as the regular expression store 350 (shown in FIG. 3). The common regular expression 560 is then used to screen new content items. The common regular expression 560 can also be evaluated in 570 to determine whether the false positive rate of the common regular expression 560 is higher than a threshold rate.

The process described in FIGS. 5A and 5B are repeated for other clusters, such as clusters 532 and 534, and sub-clusters to generate multiple common regular expressions that can be stored in regular expression store 350.

Evaluation of Regular Expressions

Figure 6:
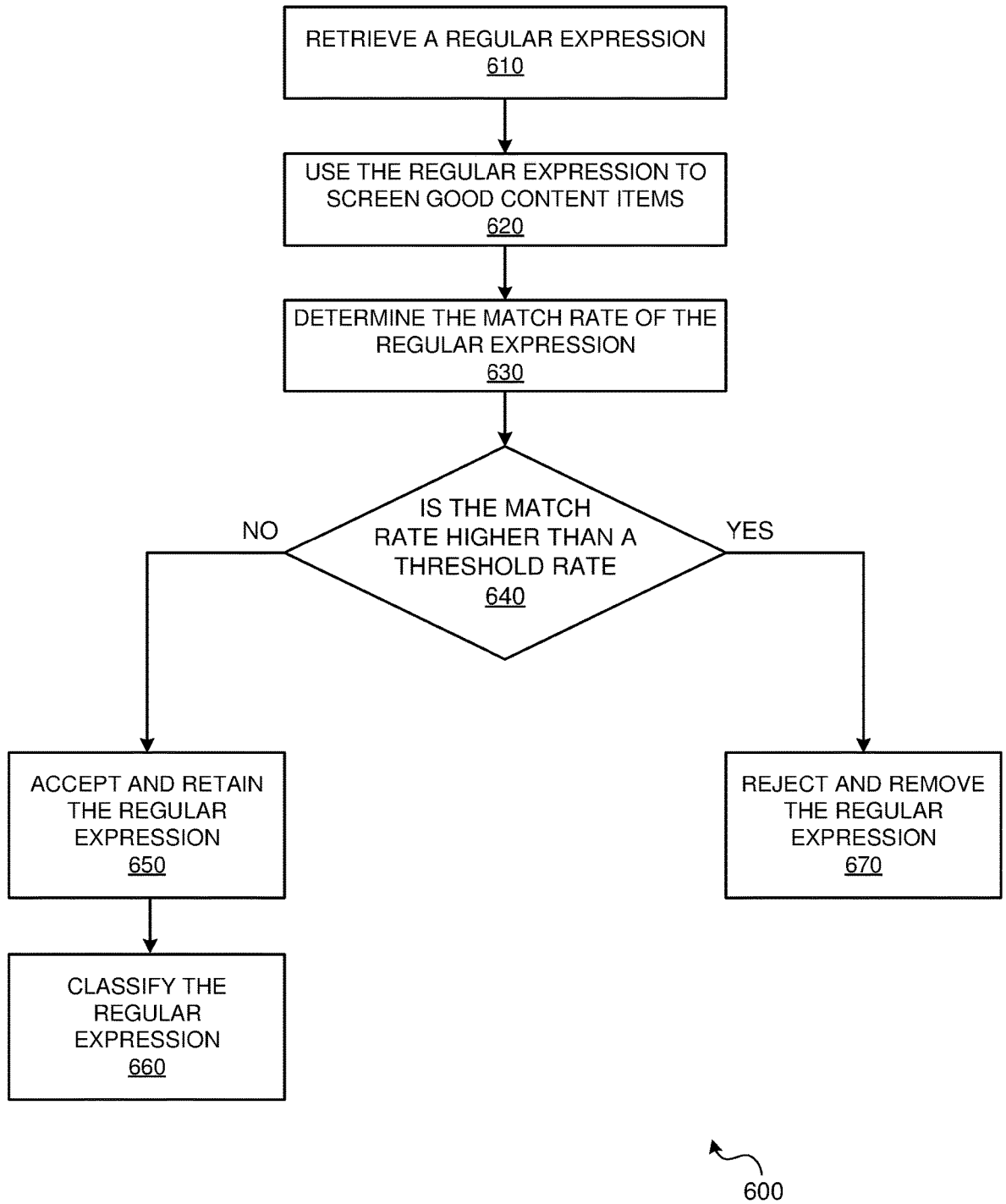
FIG. 6 illustrates a flowchart of a process for evaluating accuracy of a regular expression in accordance with some embodiments.

FIG. 6 illustrates a flowchart of a process 600 performed by an online system for evaluating whether a common regular expression generated through the processes described in FIGS. 4, 5A, and 5B should be used to screen new content items. The process 600 can be carried by the online system 140 or by one of the sub-module of the online system 140, such as by the training module 370. The process 600 begins in 610, where a regular expression stored in the regular expression store 350 is retrieved. In 620, the regular expression retrieved is used to screen known compliant content items. The training module 370 may store, for training purpose, a bank of known content items that have already been determined to be compliant with the policies of the online system 140. In one case, the bank of known compliant content items is updated at least partially from time to time. There can also be multiple banks of known compliant content items that are grouped by the geographical locations of the origins of the content items, the subject matters, user profiles, and other categories. The known compliant content items are matched against the retrieved regular expression to determine whether the textual content of any of the known compliant content items contain the textual pattern defined the regular expression. In 630, the match rate of the regular expression is determined.

In decision stage 640, the training module 370 determines whether the match rate is higher than a predetermined threshold rate. The threshold rate may vary depending on situation. In one case, the threshold rate is 0.01%. In another case, the threshold rate is 0.1%. In yet another case, the threshold rate is 5%. In some cases, the threshold rate may also be determined dynamically based on the match rates of other regular expressions stored in regular expression store 350. For example, the threshold rate may be set at a level such that the top 20% of the regular expressions having the highly false positive match rates will be rejected. The threshold rate may also be determined based on policy. Certain regular expressions are generated based on all policies but other regular expressions are generated specifically with respect to one or more certain policies. Depending on whether the online system 140 wants to strictly enforce a policy, the threshold rate may be set accordingly. For example, if the online system 140 is more lenient towards a violation of a certain policy, the false positive threshold rate with respect to that policy may be set at very low level so that only the most accurate regular expression is retained to screen new content items to avoid unnecessary false positive incidents. If the online system 140 is very strict about enforcing a policy, the false positive threshold rate with respect to that policy may be set at a higher level so that more regular expressions are retained in the system to screen the new content items with respect to that policy. If a regular expression's match rate against known compliant content items exceeds the threshold rate, in 660 the training module 670 will reject and remove the regular expression from the regular expression store 350 so that the regular expression will no longer be used to screen new content items.

If a regular expression's match rate against known compliant content items does not exceed the threshold rate, in 650 the training module 370 will accept and retain the regular expression in the regular expression store 350. The retained regular expressions are used to screen new content items. In some cases, in 660 the regular expressions may also be classified into different groups based on the match rate. The match rate may serve as one metric to determine the confidence level of the accuracy of the regular expression. A regular expression with a relatively high false positive match rate indicates that the regular expression is less accurate because it tends to identify some compliant content item as noncompliant. A regular expression with an extremely low false positive match rate indicates that the regular expression is extremely accurate in screening non-compliant content items. Hence, after the regular expressions are classified, the online system 140 may carry out different actions when a new content item is found to match with the regular expression. For the regular expression having an extremely low false positive match rate, the online system 140 may automatically block the content item, withhold it from other users, and remove it from the system. For less accurate regular expression, the online system 140 may flag the new content item for further review and evaluation.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    accessing a data store containing a plurality of content items determined to be noncompliant with one or more policies of an online system;
    generating an embedding for each of the plurality of content items using text of the content item, each embedding generated being a mathematical vector that represents semantic characteristics of textual content of the content item relative to other content items in an embedding space, the semantic characteristics determined from word-to-word co-occurrence statistics of the text;
    grouping two or more of the content items into a cluster based on distances among the embeddings corresponding to the two or more content items in the embedding space, the distances determined from the semantic characteristics of each of the content items according to the word-to-word co-occurrence statistics of the text of each of the content items;
    extracting one or more strings of words from the textual content of one or more of the content items in the cluster;
    creating a common regular expression that represents the one or more strings of words;
    receiving a new content item for distribution by the online system;
    screening the new content item by applying the common regular expression to determine whether the new content item matches the common regular expression; and
    responsive to determining that the new content item matches the common regular expression, withholding the content item from users of the online system.

2. The method of claim 1, further comprising:
    further responsive to determining that the new content item matches the common regular expression, adding the new content item to the data store that contains the plurality of content items determined to be noncompliant.

3. The method of claim 1, further comprising:
    applying the common regular expression to a plurality of known compliant content items that are determined to be compliant with the one or more policies of the online system;
    determining a match rate of the common regular expression with respect to the known compliant content items; and
    responsive to the match rate being higher than a predetermined threshold, removing the common expression from screening the new content item.

4. The method of claim 1, wherein generating the embedding for each of the plurality of content items comprises taking an average of word vectors corresponding to the textual content of each of the content item, the average being the mathematical vector.

5. The method of claim 1, wherein generating the embedding for each of the plurality of content items comprises:
    providing the textual content as input to a deep neural network; and
    determining the embedding representing the textual content based on an output of the deep neural network.

6. The method of claim 1, wherein the one or more strings of words of each of the content items comprises the entire textual content of the content item.

7. The method of claim 1, wherein creating the common regular expression comprises:
    determining a regular expression for the one or more strings of words for each of the content items;
    generating a plurality of automata, each of the plurality of automata corresponding to each of the regular expression;
    merging the plurality of automata into a common automaton; and
    generating the common regular expression based on the common automaton.

8. The method of claim 1, wherein the new content item comprises a landing page of a third party web site.

9. The method of claim 1, wherein the new content item comprises an advertisement.

10. A non-transitory computer readable storage medium configured to store program code, the program code comprising instructions that, when executed by a processor, cause the processor to:
    access a data store containing a plurality of content items determined to be noncompliant with one or more policies of an online system;
    generate an embedding for each of the plurality of content items using text of the content item, each embedding generated being a mathematical vector that represents semantic characteristics of textual content of the content item relative to other content items in an embedding space, the semantic characteristics determined from word-to-word co-occurrence statistics of the text;
    group two or more of the content items into a cluster based on distances among the embeddings corresponding to the two or more content items in the embedding space, the distances determined from the semantic characteristics of each of the content items according to the word-to-word co-occurrence statistics of the text of each of the content items;
    extract one or more strings of words from the textual content of one or more of the content items in the cluster;
    create a common regular expression that represents the one or more strings of words;

receive a new content item for distribution by the online system;

screen the new content item by applying the common regular expression to determine whether the new content item matches the common regular expression; and responsive to determining that the new content item matches the common regular expression, withhold the content item from users of the online system.

11. The non-transitory computer readable storage medium of claim 10, wherein the program code further causes the processor to, further responsive to determining that the new content item matches the common regular expression, add the new content item to the data store that contains the plurality of content items determined to be noncompliant.

12. The non-transitory computer readable storage medium of claim 10, wherein the program code further causes the processor to:

apply the common regular expression to a plurality of known compliant content items that are determined to be compliant with the one or more policies of the online system;

determine a match rate of the common regular expression with respect to the known compliant content items; and responsive to the match rate being higher than a predetermined threshold, remove the common expression from screening the new content item.

13. The non-transitory computer readable storage medium of claim 10, wherein generating the embedding for each of the plurality of content items comprises taking an average of word vectors corresponding to the textual content of each of the content item, the average being the mathematical vector.

14. The non-transitory computer readable storage medium of claim 10, wherein generating the embedding for each of the plurality of content items comprises:

providing the textual content as input to a deep neural network; and determining the embedding representing the textual content based on an output of the deep neural network.

15. The non-transitory computer readable storage medium of claim 10, wherein the one or more strings of words of each of the content items comprises the entire textual content of the content item.

16. The non-transitory computer readable storage medium of claim 10, wherein creating the common regular expression comprises:

determining a regular expression for the one or more strings of words for each of the content items;

generating a plurality of automata, each of the plurality of automata corresponding to each of the regular expression;

merging the plurality of automata into a common automaton; and generating the common regular expression based on the common automaton.

17. The non-transitory computer readable storage medium of claim 10, wherein the new content item comprises a landing page of a third party website.

18. The non-transitory computer readable storage medium of claim 10, wherein the new content item comprises an advertisement.

* * * * *